(12) United States Patent
Song (10) Patent No.: US 12,532,979 B2
(45) Date of Patent: Jan. 27, 2026

(54) STORAGE BAG AND STORAGE DEVICE (71) Applicant: Tao Song, Ganzhou (CN)

(72) Inventor: Tao Song, Ganzhou (CN)

( * ) Notice: Subject to any disclaimer, the term of this patent is extended or adjusted under 35 U.S.C. 154(b) by 0 days.

(21) Appl. No.: 18/765,218

(22) Filed: Jul. 6, 2024

(65) Prior Publication Data

US 2025/0160553 A1 May 22, 2025

(30) Foreign Application Priority Data

Nov. 21, 2023 (CN) ........................ 202323143339.0
Jun. 19, 2024 (CN) ........................ 202421411581.3

(51) Int. Cl.
*B65D 33/04* (2006.01)
*A47G 33/04* (2006.01)
*B65D 33/01* (2006.01)
*B65D 33/02* (2006.01)

(52) U.S. Cl.
CPC ............. *A47G 33/04* (2013.01); *B65D 33/01* (2013.01); *B65D 33/02* (2013.01); *B65D 33/04* (2013.01)

(58) Field of Classification Search
CPC ........ B65D 33/02; B65D 33/04; B65D 85/00; B65D 85/64
USPC ........................................................ 206/423
See application file for complete search history.

(56) References Cited

U.S. PATENT DOCUMENTS

| 5,671,766 | A  | * | 9/1997  | Williams  | E04H 15/48 135/144 |
| 7,160,588 | B2 | * | 1/2007  | Sanford   | A47G 33/06 428/18 |
| 8,066,138 | B2 | * | 11/2011 | Boyles    | A01K 97/08 206/315.3 |
| 11,764,726 | B1 | * | 9/2023 | Wynn      | H02S 20/00 136/245 |
| 2007/0227925 | A1 | * | 10/2007 | Westrate | B65D 85/52 206/423 |
| 2008/0257770 | A1 | * | 10/2008 | Limber   | B62B 1/26 206/423 |
| 2017/0065089 | A1 | * | 3/2017 | Schubiger | E04H 15/44 |
| 2020/0318376 | A1 | * | 10/2020 | Ruggiero | A61M 21/02 |
| 2021/0032897 | A1 | * | 2/2021 | Hutnak    | E04H 15/54 |

* cited by examiner

*Primary Examiner* — Anthony D Stashick
*Assistant Examiner* — Raven Collins
(74) *Attorney, Agent, or Firm* — Zhigang Ma (57) ABSTRACT

The present disclosure provides a storage bag which includes a body being capable of standing upright and defining a storage space for storing an item, and at least one support member arranged on the body and configured for supporting the body, the support member can prevent the body from pressing the item in the storage space. The present disclosure further provides a storage device having the storage bag.

20 Claims, 10 Drawing Sheets

STORAGE BAG AND STORAGE DEVICE

CROSS-REFERENCE TO RELATED APPLICATIONS

The application claims priority of Chinese patent application CN202323143339.0 filed Nov. 21, 2023, and Chinese patent application CN202421411581.3 filed Jun. 19, 2024, each of which is hereby incorporated by reference in its entirety.

FIELD

The present disclosure relates to a storage bag and a storage device having the storage bag.

BACKGROUND

Storage bags are usually used to protect items contained therein from damage and contamination. The storage bags are normally made of soft materials, so the storage bags are prone to press and squeeze the items, which may deform or even damage the items.

SUMMARY

The present disclosure provides a storage bag which includes a body being capable of standing upright and defining a storage space for storing an item, and at least one support member arranged on the body and configured for supporting the body, the support member can prevent the body from pressing the item in the storage space.

The present disclosure further provides a storage bag which includes an upright body defining a storage space for storing an item, and at least one support member arranged on the body and configured for supporting the body, the support member can prevent the body from pressing the item in the storage space. The at least one support member is elastic and configured to tauten the body to form at least one panel.

The present disclosure further provides a storage device, which includes a storage bag and a support configured for supporting item. The storage bag includes a body being capable of standing upright and defining a storage space for storing an item, and at least one support member arranged on the body and configured for supporting the body, the support member can prevent the body from pressing the item in the storage space.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION

Technical solutions in the embodiments of the present disclosure will be clearly and completely described below by referring to the accompanying drawings in the embodiments of the present disclosure. Obviously, the described embodiments are only a part of, but not all of, the embodiments of the present disclosure. All other embodiments obtained by a person of ordinary skill in the art based on the embodiments in the present disclosure and without making creative work shall fall within the scope of the present disclosure.

Referring to FIGS. 1-11, the present disclosure provides a storage bag 100 according to an exemplary embodiment, the storage bag 200 can protect the item contained therein from being damaged. For example, the storage bag 200 can protect columnar item, for example, Christmas tree, fruit tree, mobile stereo, electric oven, sculpture, fountain, etc. The above are some examples of the use of the storage bag 100, and users can use the storage bag 100 according to their needs and preferences.

Figure 1:
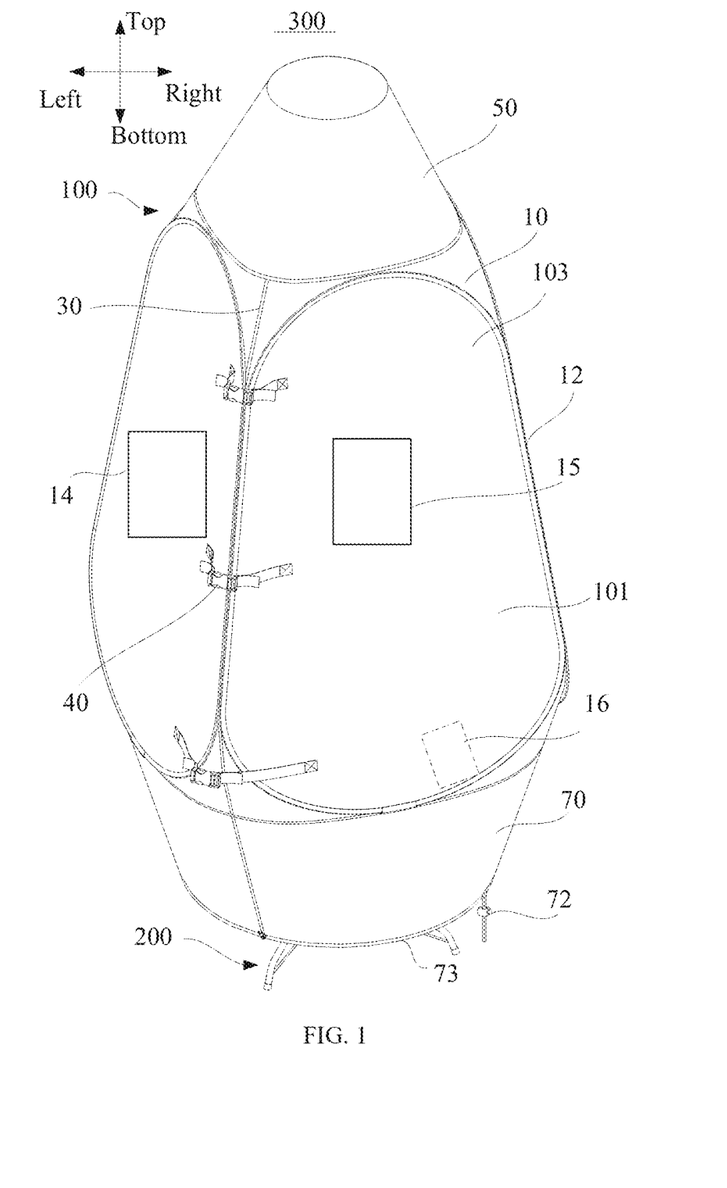
FIG. 1 is a structure diagram of the storage device according to an exemplary embodiment of the present disclosure.
Figure 2:
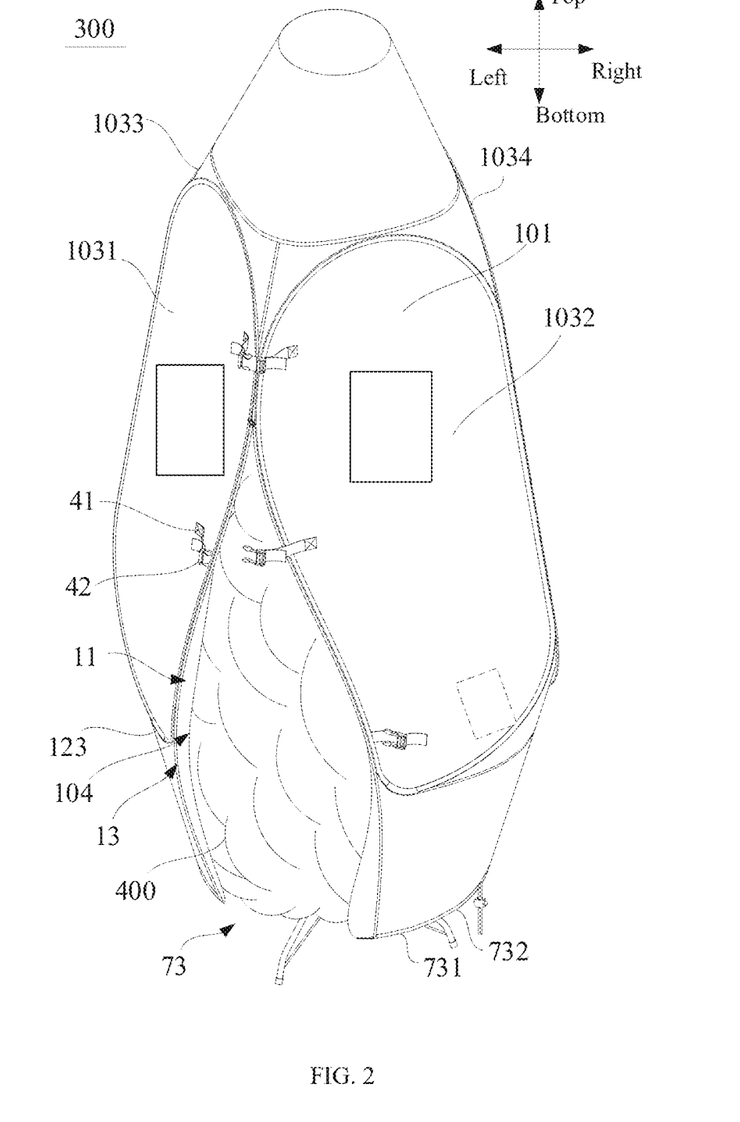
FIG. 2 is a structure diagram of the storage device of FIG. 1, wherein the storage device is in an opened state, and an item is received in the storage device.
Figure 3:
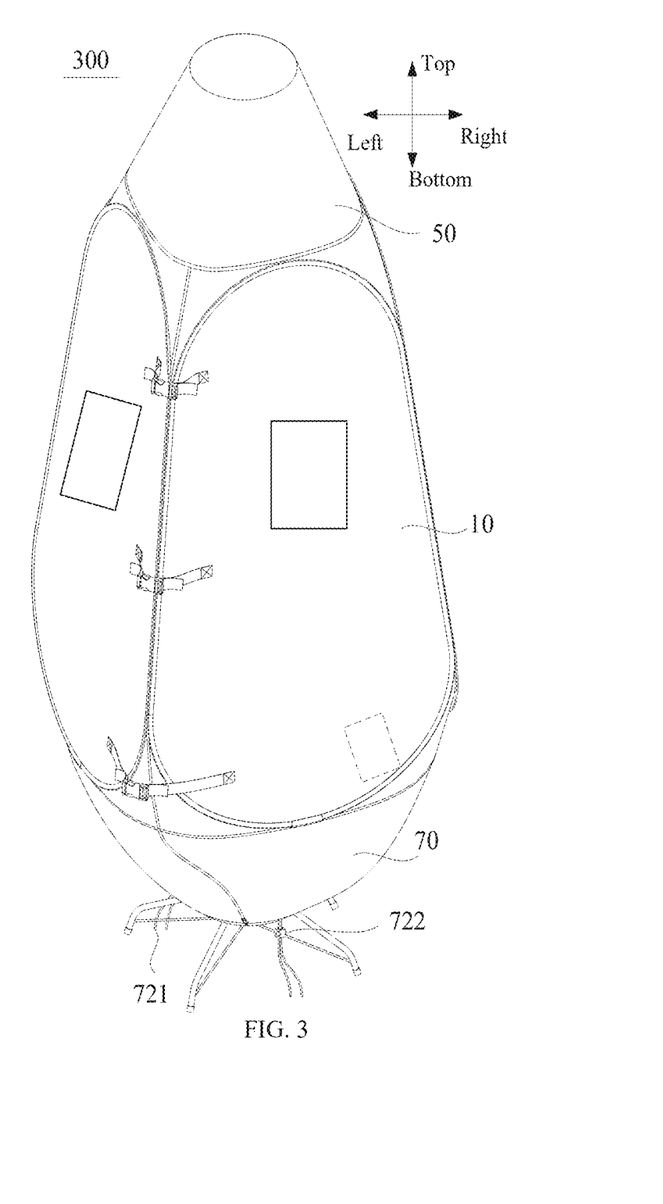
FIG. 3 is a structure diagram of the storage device of FIG. 1, wherein a bottom of the storage device is in a tautened state.

The storage bag 100 includes an upright body 10 and at least one support member 20 arranged on the body 10. The body 10 defines a storage space 11 for storing item 400. It should be understood that the body 10 is upright when it is in a natural state. Compared with a horizontal bag, the upright body 10 squeezes or presses less on the item 400 contained therein. The at least one support member 20 is arranged on a side surface 103 of the body 10 and can support and tauten the side surface 103 of the body 10 to increase the volume of the storage space 11, so as to prevent the body 10 from collapsing and pressing the item 400 contained therein. In this way, the item 400 contained therein can be protect effectively.

In a specific use scenario, the storage bag 100 of the present disclosure can be used as a Christmas tree storage bag, for protecting Christmas tree from dust and other pollution. In another specific use scenario, the storage bag 100 of the present disclosure can be used as a fruit tree storage bag, the leaves, flowers and fruits of the fruit tree can be protected when the fruit tree is stored in the storage bag 100; specifically, the storage bag 100 may not deform or collapse to press the fruit tree when encountering rain, snow or wind, and the fruit tree can also be protected from dust and other pollution.

The body 10 substantially has a columnar structure. Preferably, a size of the body 10 gradually increases along the direction from top to bottom, so that the item 400 with a large bottom and a small top can be stored therein. In another embodiment, the size of the body 10 gradually decreases from the middle portion to both ends. The body 10 is preferably made of soft material, such as cloth, plastic, leather, or the like. The soft material is prone to collapse or deform, while the soft material can be tautened tightly when the support member 20 supports the body 10. So that the item 400 in the storage space 11 can be prevented from being pressed by the collapsed soft material. The body 10 may be designed to be waterproof or breathable. The body 10 may be elastic or may be set to be inelastic.

The body 10 defines an opening 104 that communicates with the storage space 11, and the item 400 can be placed in the storage space 11 by the opening 104. The opening 104 can be defined at a bottom of body 10. The body 10 further defines at least one gap 13 along an axial direction, and the gap 13 passes through a lower edge of the body 10 and communicates with the opening 104 and the storage space 11. The gap 13 may also pass through an upper edge of the body 10, or may not pass through the upper edge of the body 10. An upper end of the gap 13 can be arranged at the upper end of the body 10, or arranged at the middle portion of the body 10. The height and position of the gap 13 can be designed according to the actual situation, and the present disclosure does not limit the height and position of the gap 13.

The body 10 includes at least one pocket 14 arranged on an inner surface and/or an outer surface thereof, the pocket 14 is used to accommodate accessories, such as ornaments of Christmas tree, and the like. The position and size of the pocket 14 can be set according to the height of the storage bag 100, and the present disclosure does not limit the position and size of the pocket 14.

The body 10 further includes at least one window 15 for revealing the item 400 in the storage space 11. User can get the status of the Christmas tree in the storage space 11 through the window 15. The window 15 can be a through hole or a transparent film. Preferably, the window 15 is arranged at a portion enclosed by the support member 20. The position and size of the window 15 can be set according to the height of the storage bag 100, and the present disclosure does not limit the position and size of the window 15.

The storage bag 100 further includes at least one air circulator 16 arranged on the body 10, for providing fresh air for the item 400 in the storage space 11. When plants such as Christmas tree or fruit tree needs to be stored, fresh air should be provided to keep them fresh. Of course, the storage bag 100 further includes a connector (not shown), a controller (not shown), and other necessary components, the connector may be a plug or the like and can provide power to the air circulator 16, and the controller can control the air circulator 16 to work or stop working.

Figure 4:
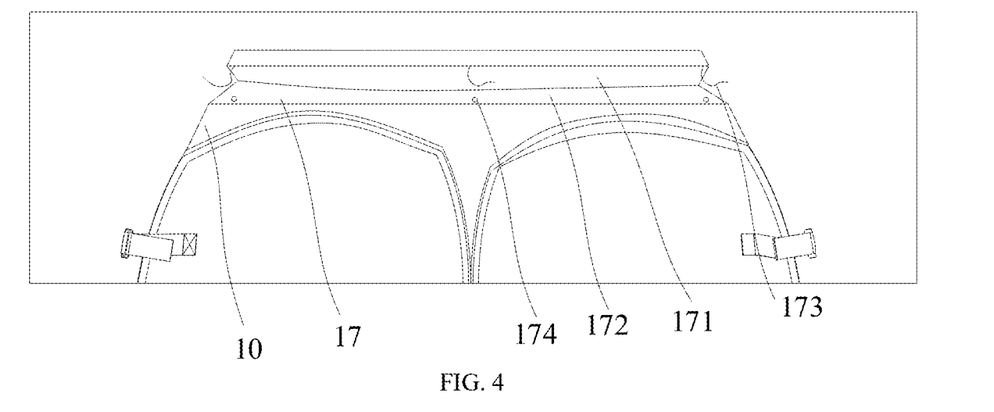
FIG. 4 is a structure diagram of a part of the bag of the storage device according to another exemplary embodiment of the present disclosure, wherein the bag includes an extension part.

The body 10 is provided with an extension part 17 arranged along a circumference thereof. The extension part 17 can be folded or unfolded, for increasing the length of the body 10. The extension part 17 includes a folding portion 171 and a folding portion 172, a connecting element 173 arranged on the folding portion 171, and a connecting element 174 arranged on the folding portion 172. The connecting element 173 and the connecting element 174 are selected from hook and loop fasteners, buckle, buckle hole, button, clamp, clamp seat, rope, and the like. When the connecting portion 173 is separated from and the connecting portion 174, the extension part 17 is unfolded, and the length of the body 10 is increased to be suitable for storing items 400 of different sizes, as such Christmas trees of different sizes can be stored in the body 10. When the extension part 17 is folded, the connecting portion 173 is connected with the connecting portion 174 to maintain the folded state of the extension part 17.

The support member 20 can be made of plastic or metal (such as aluminum, copper, steel alloy, copper alloy, aluminum alloy, and the like). The support member 20 is elastic, so that the support member 20 can deform into a required shape and have a rebound force, the rebound force can effectively support and tauten the body 10 to prevent the body 10 from squeezing or pressing the item 400. The support member 20 is easy to be deformed and folded, as such user can fold the storage bag 100 easily. The diameter of the support member 20 can be 1-10 mm, for example 1 mm, 2 mm, 3 mm, 4 mm, 5 mm, 6 mm, 7 mm, 8 mm, 9 mm, or 10 mm. The bending stiffness of the support member 20 is related to the diameter of the support member 20, the resilience force of the support member 20 in the folded state is not too large to hit user when user wants to unfolded the body 10 and the support member 20.

The support member 20 may have a regular shape or an irregular shape, the regular shape includes an annular shape, a triangular shape, a rectangular shape, a square shape, a circular shape, a pentagonal shaped, a diamond shape, an oval shape, a trapezoidal shape, etc. In an embodiment, the upper end of the support member 20 is arc-shaped, and the lower end of the support member 20 is also arc-shaped, and the two middle parts of the support member 20 is straight, and a radian of the arc-shaped upper end is greater than that of the arc-shaped lower end, and an arc length of the arc-shaped upper end is less than that of the arc-shaped lower end. A space between the two middle parts gradually increases from top to bottom, and the space between the two middle parts is about 150-180 cm, e.g. 150 cm, 160 cm, 170 cm, or 180 cm. The space between the top portions of the two middle parts is about 150-160 cm, e.g. 150 cm, 155 cm, 160 cm; the space between the lower portions of the two middle parts is about 160-180 cm, e.g. 160 cm, 165 cm, 170 cm, 175 cm, 180 cm.

A plurality of support portions 20 can be arranged at intervals along the circumference of body 10, so as to form a plurality of panels 101 on the body 10 which are in tautened states. The support portions 20 can be on the side surface of the body 10. It should be understood that the panel 101 is an area that is in a tautened state due to a support of the support member 20. The pocket 14, the window 15 and the air circulator 16 may be arranged on the panel 101. When the panel 101 made of flexible material is in the tautened state, the panel 101 does not collapse and press the item 400 in the body 10. For example, Christmas tree has many branches that are thin and extend outwards, the branches are prone to be pressed and deformed by the existing storage bag, the Christmas tree may be unfit for reuse if the branches are pressed and deformed. The panel 101 in the tautened state can increase the volume of the storage space 11 of the body 10, as such the panel 101 may not press on the Christmas tree to avoid the deformation of the Christmas tree. When user wants to open the body 10 by the opening and closing structure 30, user can lift the panel 101 in the tautened state easily as the panel 10 does not stick or fold together. In this way, user can put in or taken out the item 400 quickly.

In one embodiment, a plurality of support members 20, such as four support members 20, are arranged at intervals along the circumference of the body 10. Of course, a plurality of support members 20 can also be arranged at intervals along the axial direction of body 10. In another embodiment, some support members 20 can be arranged at intervals along the circumference of the body 10, and some support members 20 are arranged at intervals along the axial direction of body 10.

Of course, the quantity of the support member 20 can be one, three, four, five, or six, and so on. The quantity and the shape of the at least one support member 20 can be set according to actual needs, and a total area enclosed by the at least one support member 20 is about three-tenths to nine-tenths of an outer surface area of the body 10, as such the body 10 can be effectively supported and storage. Specifically, the total area enclosed by the at least one support member 20 is three-tenths, four-tenths, five-tenths, six-tenths, seven-tenths, eight-tenths, or nine-tenths of the outer surface area of the body 10.

A size of the support member 20 gradually increases along the direction from top to bottom, as such the item 400 with a large bottom and a small the top can be stored in the body 10. The size of the support member 20 can also gradually decrease from the middle portion to both ends, as such the item 400 with a large middle part and small ends can be stored in the body 10. The size of the storage space 11 of the body 10 also gradually increases from top to bottom, as such the storage bag 100 is suitable for storing items 400 such as Christmas trees with a small top and a large bottom. The size of the storage space 11 of the body 10 can also gradually decrease from the middle portion to both ends.

Figure 5:
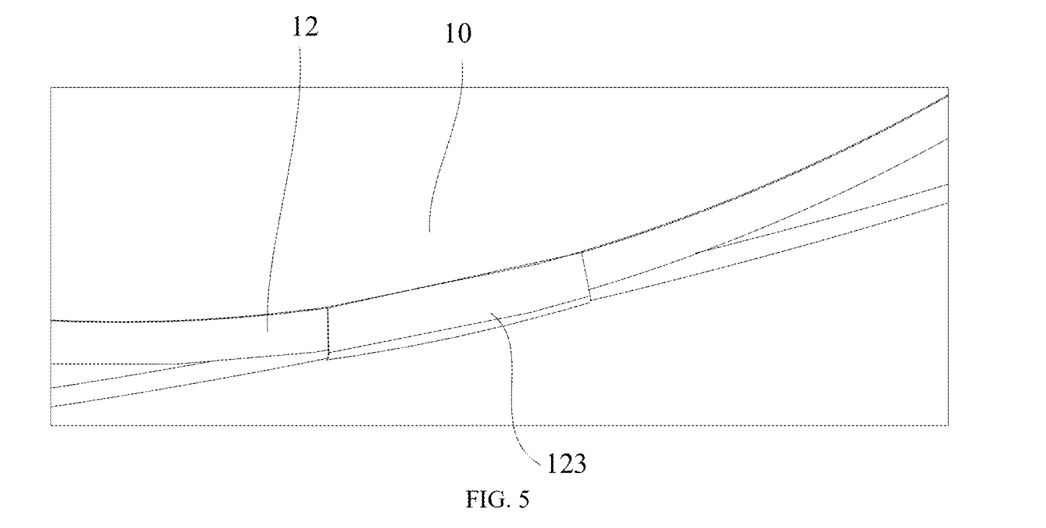
FIG. 5 is a structure diagram of a part of the bag and a part of the support member of the storage device of FIG. 1, wherein a mounting portion of the bag is in a closed state.
Figure 6:
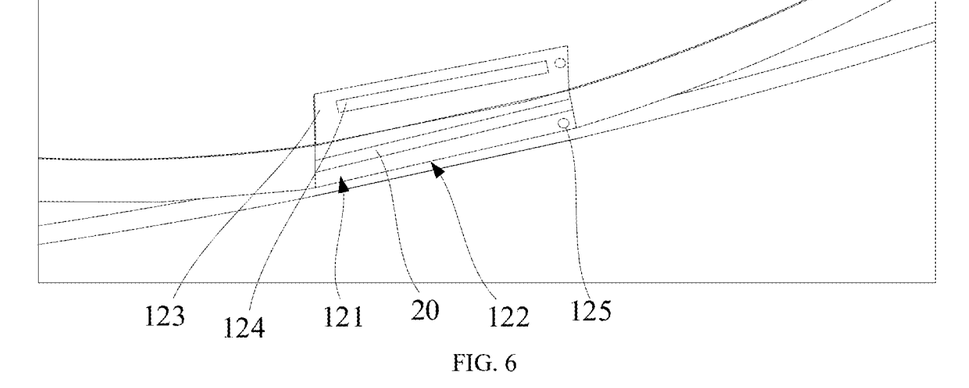
FIG. 6 is a structure diagram of a part of the bag and a part of the support member of the storage device of FIG. 1, wherein the mounting portion of the bag is in an opened state.

The body 10 further includes at least one mounting portion 12. The mounting portion 12 is arranged on the inner surface or the outer surface of body 10. The at least one support member 20 is mounted in the at least one mounting portion 12, the at least one support member 20 supports the body 10, and the area of the body 10 enclosed by the support member 20 can be designed to have a certain shape. The mounting portion 12 may have an annular shape, a triangular shape, a rectangular shape, a square shape, a circular shape, a pentagonal shaped, a diamond shape, an oval shape, a trapezoidal shape, etc. The area of the body 10 enclosed by the support member 20 can have an annular shape, a triangular shape, a rectangular shape, a square shape, a circular shape, a pentagonal shaped, a diamond shape, an oval shape, a trapezoidal shape, etc. The mounting portion 12 and the body 10 may be made of the same material or different materials.

In an embodiment, the mounting portion 12 is arranged on the outer surface of the body 10. Specifically, the mounting portion 12 is sewn to the outer surface of the body 10. Of course, the mounting portion 12 may also be arranged on the inner surface of the body 10. Specifically, the mounting portion 12 is sewn to the inner surface of the body 10. The mounting portion 12 may be integrated with body 10, or the mounting portion 12 and the body 10 are separately prepared and connected together.

In an embodiment, the mounting portion 12 has a continuous strip-shaped structure, and the support member 20 is wrapped in the mounting portion 12. For example, the mounting portion 12 is a continuous cloth strip, two sides of the cloth strip are sewn on the body 10 to form a mounting cavity 121, the support member 20 is mounted in the mounting cavity 121, the mounting portion 12 defines a mounting hole 122, and the support member 20 is mounted in the mounting cavity 121 through the mounting hole 122. The support member 20 in the natural state is a long strip, when the support member 20 extends into the mounting portion 12 through the mounting hole 122, the support member 20 deforms into a shape matched the mounting portion 12. The mounting portion 12 includes a cover 123 configured to cover the mounting hole 122. An inner surface of the cover 123 is detachably connected to the body 10 or detachably connected to the mounting portion 12 by means such as hook and loop fasteners 124 and button 125.

Of course, there are a plurality of mounting portions 12 which are arranged at intervals, a portion of the support member 20 is wrapped in the mounting portion 12, and another portion of the support member 20 can be exposed from the mounting portion 12.

The storage bag 100 further includes at least one opening and closing structure 30 arranged on the body 10 for opening and closing the body 10. The at least one opening and closing structure 30 is substantially arranged on body 10 along the axial direction of body 10, that is, the at least one opening and closing structure 30 is substantially arranged on body 10 along a vertical direction. There are a plurality of opening and closing structures 30 which are arranged on the body 10 spaced from each other. The opening and closing structure 30 can be positioned between two adjacent support members 20, and when user opens the body 10 the support member 20 moves with the body 10 simultaneously. As the panel 101 of the body 10 is in the tautened state, the body 10 or the panel 101 may not deform when the body 10 is opened. User can lift the plate shaped panel 101 to open the body 10 without affecting the operations of putting in or taking out of the item 400. In a specific embodiment, the front and rear of the body 10 are both provided with one opening and closing structures 30, and the two opening and closing structures 30 are arranged face towards each other. User can put the item 400 into the storage space 11 or take the item 400 out of the storage space 11 easily. In one embodiment, the side surfaces 103 includes a first side surface 1031, a second side surface 1032, a third side surface 1033, and a fourth side surface 1034 which are connected with each other in sequence, one gap 104 is defined between the first side surface 1031 and the second side surface 1032, another gap 104 is defined between the third side surface 1033 and the fourth side surface 1034, one opening and closing structure 30 is connected between the first side surface 1031 and the second side surface 1032, so as to detachably connect the first side surface 1031 with the second side surface 1032; another one opening and closing structure 30 is connected between the third side surface 1033 and the fourth side surface 1034, so as to detachably connect the third side surface 1033 with the fourth side surface 1034. A portion of the opening and closing structure 30 and one support member 12 are arranged on the first side surface 1031, and another portion of the opening and closing structure 30 and another support member 12 are arranged on the second side surface 1032. A portion of the another opening and closing structure 30 and one corresponding support member 12 are arranged on the third side surface 1033, and another portion of the another opening and closing structure 30 and another corresponding support member 12 are arranged on the fourth side surface 1034.

When the body 10 is opened by the opening and closing structure 30, the gap 13 communicates with the opening 104, and user can put the item 400 into the storage space 11 or take the item 400 out of the storage space 11 easily.

When the opening and closing structure 30 is a zipper, a cloth tape of the zipper is arranged at one side of the gap 13, and the other cloth tape is arranged at the other side of the gap 13. The teeth of the zipper can be separated from each other or engaged with each other by a slider of the zipper to open or close the gap 13. When the body 10 is opened, the item 400 may be placed into the storage space 11 or taken out from the storage space 11.

When the opening and closing structure 30 includes hook and loop fasteners, one hook fastener is arranged at one side of gap 13, and one loop fastener is arranged at the other side of gap 13. The hook and loop fasteners can be used to open or close the gap 13.

When the opening and closing structure 30 includes a snap button structure, at least one female button is arranged at one side of the gap 13, and at least one male button is arranged at the other side of the gap 13. The snap button structure can be used to open or close the gap 13.

When the opening and closing structure 30 includes a buckle and a buckle hole, at least one buckle is arranged at one side of the gap 13, and at least one buckle hole is arranged at the other side of the gap 13, and the buckle can be fixed in the buckle hole or separated from the buckle hole to open or close the gap 13.

When the opening and closing structure 30 includes magnetic elements, at least one magnetic element is arranged at one side of the gap 13, at least one magnetic element is arranged at the other side of the gap 13, and the magnetic elements can be used to open or close the gap 13.

When the opening and closing structure 30 includes ropes, at least one first rope is arranged at one side of the gap 13, at least one second rope is arranged at the other side of the gap 13, and the ropes can be used to open or close the gap 13.

When the opening and closing structure 30 includes a rope and a rope hole, at least one rope is arranged at one side of the gap 13, at least one rope hole is arranged at the other side of the gap 13, and the rope can be fixed in the rope hole or separated from the rope hole to open or close the gap 13.

The storage bag 100 further includes at least two fixing members 40. The fixing member 40 includes a connecting portion 41 connected with the body 10 and a fixing portion 42 connected with the connecting portion 41, and the two fixing portions 42 are detachably connected with each other. In a specific embodiment, the connecting portion 41 may be a connecting belt, the fixing portion 42 may be a clamp or a clamp seat, and the clamp can be detachably clamped in the clamp seat. Of course, the fixing member 40 can have other structures, such as hook and loop fasteners, rope and the like.

The two connecting portions 41 do not need to be arranged around the body 10 in a circle, the two connecting portions 41 can be respectively located at the two sides of the opening and closing structure 30, the two connecting portions 41 cross the gap 13 and the two fixing portions 42 are detachably connected together. In this way, the fixing members 40 will not press the body 10 and the item 400 in the body 10, and the fixing members 40 can also fix or fasten the item 400 in the body 10 to prevent the item 400 in the body 10 from squeezing the body 10 too much. Of course, the present disclosure does not limit the lengths of the connecting portions 41, and the connecting portions 41 can also be set to sleeve around body 10.

In one embodiment, the two connecting portions 41 are arranged at two sides of the opening and closing structure 30, or arranged at two sides of the gap 13. In another embodiment, the two fixing portions 42 are arranged at two sides of the opening and closing structure 30, and connected to the area of the body 10 enclosed by the support member 20, that is, the two fixing portions 42 are arranged at two panels 101 to further tauten the panel 101; or the fixing portion 42 may be arranged at a portion of the body adjacent to the panel 101, that is, the fixing portion 42 is not arranged on the panel 101, but arranged on an area between the panel 101 and the opening and closing structure 30, at this time the panel 101 can also be effectively tautened.

It should be understood that, the two fixing portions 42 are connected to form a loop which can be used as a handle.

The storage bag 100 further includes a top 50 communicated with the body 10. The size of the top 50 gradually decreases along the direction away from the body 10, and the top 50 is tapered. Of course, the top 50 can also have a cylindrical structure, and the dimension of the top 50 remains substantially unchanged. The opening and closing structure 30 may be arranged on the body 10 and the top 50 for opening or closing the body 10 and the top 50. The top 50 can be integrally formed with body 10, or the top 50 and the body are formed separately and then detachably or fixedly connected together. For example, the top 50 is detachably connected with the body 10 by a zipper, etc.

The top 50 can be used as extension sleeve, so that the storage bag 100 can be used to store the item 400 with a higher height. The length of the top 50 can be about 20-35 cm, for example the length of the top 50 is 20 cm, 25 cm, 30 cm, or 35 m.

Figure 7:
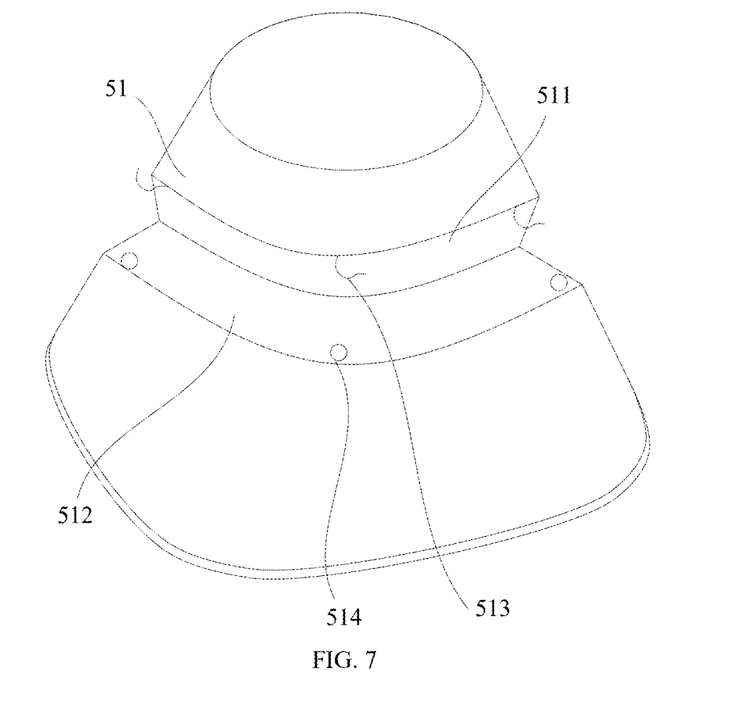
FIG. 7 is a structure diagram of a part of the top of the storage device according to another exemplary embodiment of the present disclosure, wherein the top includes an extension part.

The top 50 has an extension part 51 arranged along the circumference thereof, and the extension part 51 is foldable for increasing the length of the top 50. The extension part 51 includes a folding portion 511, a folding portion 512, a connecting portion 513 arranged on the folding portion 511, and a connecting portion 514 arranged on the folding portion 512. The connecting portion 513 and the connecting portion 514 are selected from hook and loop fasteners, buckle, buckle hole, button, clamp, clamp seat, rope, and the like. When the connecting portion 513 is separated from the connecting portion 514, the extension part 51 is unfolded, and the length of the top 50 is increased so as to be suitable for storing items 400 of different sizes, Christmas trees of different sizes can be stored. When the second extension part 51 is folded, the connecting portion 513 is connected with the connecting portion 514 to maintain the folded state of the second extension part 51.

The storage bag 100 further includes a bottom 70 which is communicated with the body 10. The size of the bottom 70 gradually decreases or increase along the direction away from the body 10 (i.e., from top to bottom). Of course, the bottom 70 can also have a cylindrical structure. The bottom 70 is integrally formed with body 10, or the bottom 70 and the body 10 are formed separately and detachably or fixedly connected together. The opening and closing structure 30 can be arranged on the body 10 and the bottom 70 for opening or closing the body 10 and the bottom 70. The opening and closing structure 30 can also be arranged on the body 10, the top 50 and the bottom 70 for opening or closing the body 10, the top 50 and the bottom 70.

Figure 8:
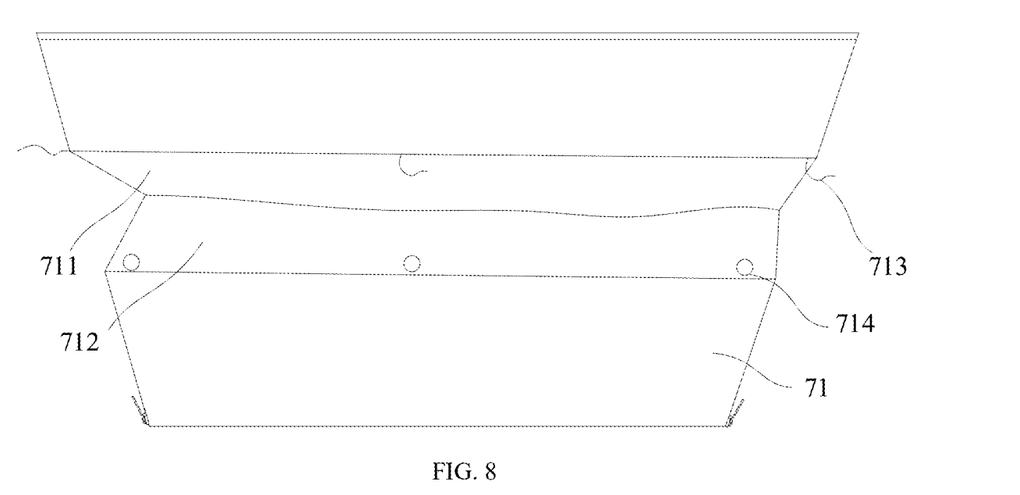
FIG. 8 is a structure diagram of a part of the bottom of the storage device according to another exemplary embodiment of the present disclosure, wherein the bottom includes an extension part.

The bottom 70 has an extension part 71 along a circumference thereof, and the extension part 71 is foldable for increasing the length of the bottom 70. The extension part 71 includes a folding portion 711, a folding portion 712, a connecting portion 713 arranged on the folding portion 711, and a connecting portion 714 arranged on the folding portion 712. The connecting portion 713 and the connecting portion 714 are selected from hook and loop fasteners, buckle, buckle hole, button, clamp, clamp seat, rope, and the like. When the connecting portion 713 is separated from the connecting portion 714, the extension part 71 is unfolded, and the length of the bottom 70 is increased so as to be suitable for storing items 400 of different sizes, such as Christmas trees of different sizes. When the extension part 71 is folded, the connecting portion 713 is connected with the connecting portion 714 to maintain the folded state of the extension part 71.

Figure 9:
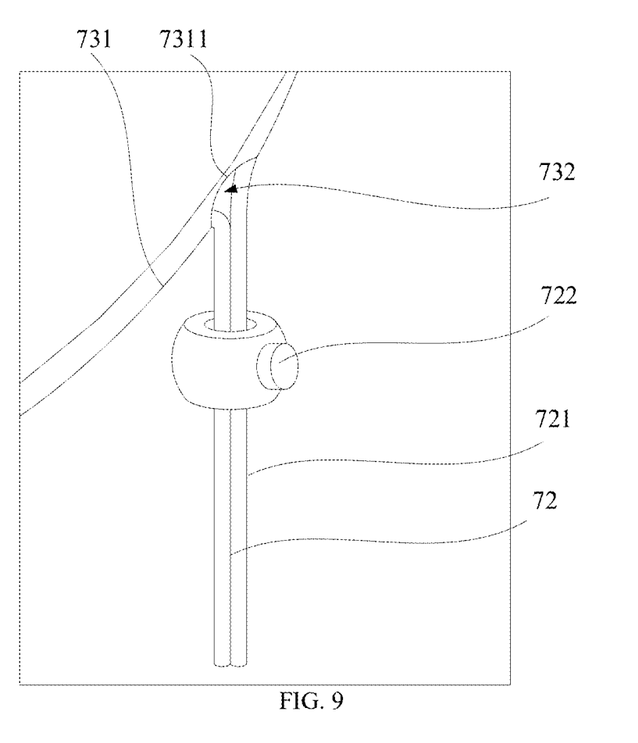
FIG. 9 is a structure diagram of a part of the bottom of the storage device of FIG. 1.

The bottom 70 has a tightening member 72 for tightening or loosening a lower end of the bottom 70 which defines an opening 73. An edge 731 of the opening 73 is curled to form a receiving groove 732 for receiving the tightening member 72. The tightening member 72 includes a rope 721 received in the receiving groove 732, and at least one buckle 722 movably sleeved on the rope 721, and the rope 721 may be a nylon rope or a metal rope. The edge 731 defines at least one through hole 7311, the rope 721 extends out of the through hole 7311, and the buckle 722 is sleeved on a portion of the rope 721 extended out of the through hole 7311. The quantity of the buckle 722 can be more than one, and the edge 731 defines a plurality of through holes 7311. In an embodiment, there are two tightening members 72, two through holes 7311 are defined in the edge 731, a portion of the rope 721 extends out from one of the through holes 7311, and another portion of the rope 721 extends out from another through hole 7311, and two buckles 722 are respectively sleeved on the portions of the rope 721 extended out of the through holes 7311. When the rope 721 is tightened, the edge 731 contracts and moves on the rope 721, the lower end of the bottom 70 gradually shrinks, and the edge 731 is maintained in a contraction state through the buckle 722 and the rope 721. When the bottom 70 shrinks, the bottom 70 stably covers the bottom of the trunk of the item 400 such as the Christmas tree, the storage bag 100 is firmly sleeved on the item 400, and the cold air can also be prevented from flowing into the body 10 by the opening 104 or the opening 73.

In another embodiment, the top 50 or the bottom 70 is also provided with at least one support member 20 and at least one mounting portion 12, as such the top 50 or the bottom 70 cam also define at least one panel 101. In this way, the top 50 or the bottom 70 can be used to accommodate items with a large top or a large bottom. It should be understood that, the top 50 or the bottom 70 can be arranged with a plurality of panels 101, and the quantity and the shape of the support member 20 on the top 50 or the bottom 70 can be set according to actual needs. A total area enclosed by the at least one support member 20 on the top 50 or the bottom 70 is about three-tenths to nine-tenths of an outer surface area of the top 50 or the bottom 70, as such the top 50 or the bottom 70 can be effectively supported and storage. Specifically, the total area enclosed by the at least one support member 20 on the top 50 or the bottom 70 is three-tenths, four-tenths, five-tenths, six-tenths, seven-tenths, eight-tenths, or nine-tenths of the outer surface area of the top 50 or the bottom 70.

In the natural state, the storage bag 100 stands upright, substantially in a cylindrical shape. In one embodiment, the storage bag 100 has four panels 101 including a first panel, a second panel, a third panel and a fourth panel, user can fold the storage bag 100 for transportation or storage, when user wants to press or fold the storage bag 10, user can place the storage bag 100 on the ground horizontally, two panels face upwards and another two panels face downwards, specifically, the first panel and the second panel face upwards and the third panel and the fourth panel face downwards, user can lift the first panel or the third panel, and fold the first panel and the third panel on the second panel and the fourth panel, and the four panels are stacked. In this way, the storage bag 100 is folded. The top 50 and the bottom 70 can also be folded on the stacked panels. User can further twist the first panel, the second panel, the third panel and the fourth panel to form an "8" shape, then user can fold these twisted panels to form a "0" shape, and the storage bag 100 can be folded into a small size for transportation and storage. When user wants to unfold the storage bag 100, user just needs to lift one or two of the "0" shaped panels, and the first panel, the second panel, the third panel and the fourth panel are automatically restored to the natural state due to the resilience force.

Figure 10:
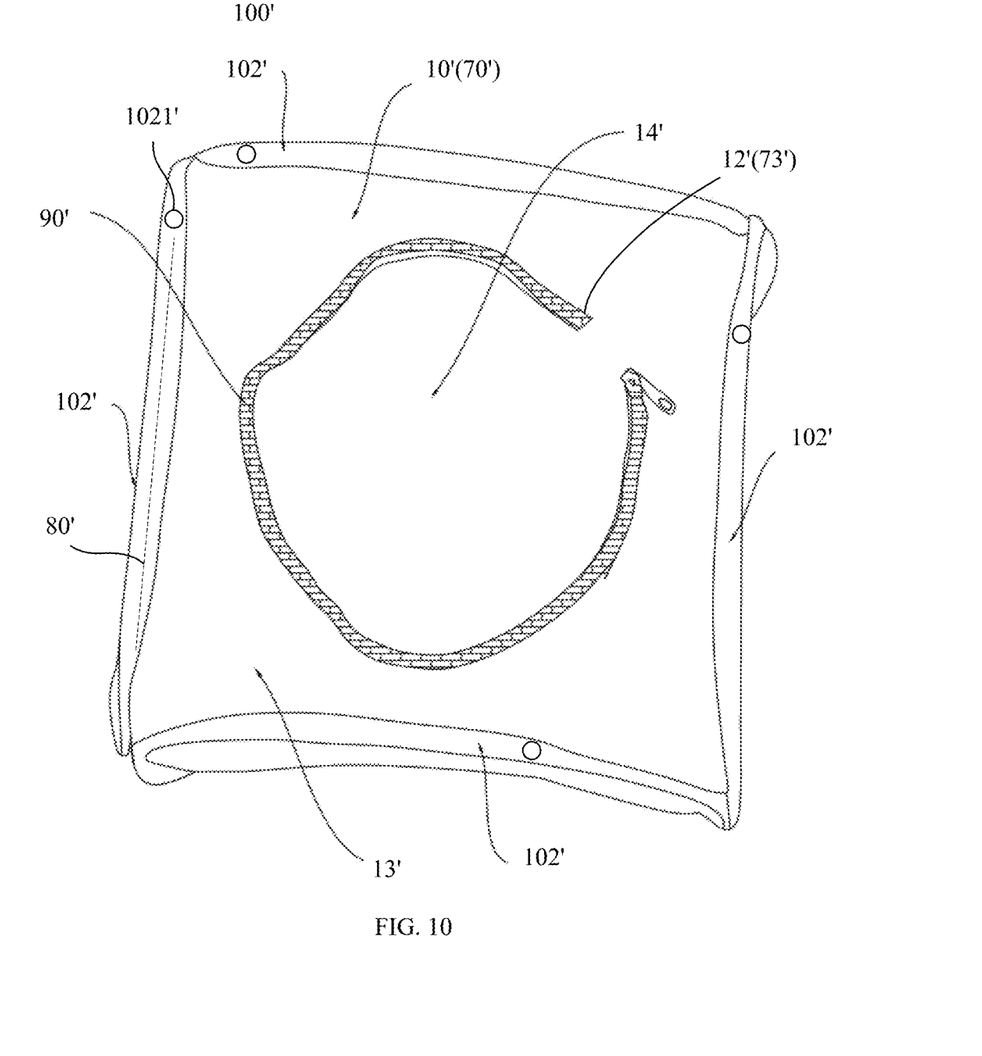
FIG. 10 is a structure diagram of the storage bag according to a second exemplary embodiment of the present disclosure.

As shown in FIG. 10, the present disclosure provides a storage bag 100' according to a second embodiment, the structure of the storage bag 100' is similar to that of the storage bag 100, and the differences between the two at least include: a periphery of the bottom 13' of the body 10' or a periphery of the bottom 70' has an accommodating portion 102', the accommodating portion 102' can be straight line shaped, polygonal shaped, circular shaped, oval shaped, or irregular shaped, and the accommodating portion 102' has a via hole 1021', and a support element 80' can pass through the via hole 1021' and extend into the accommodating portion 102', so that the storage bag 100' can firmly stand on the ground by the support member 80', and the storage bag 100' will not tilt and press the item contained therein.

When there are a plurality of support elements 80', the support elements 80' are substantially flush with each other, so that the storage bag 100' can firmly stand on the ground by the support members 80', and the storage bag 100' will not tilt and press the item contained therein.

In a specific embodiment, the periphery of the bottom 13' of the body 10' or the periphery of the bottom 70' has some accommodating portion 102' arranged at intervals, and each accommodating portion 102' is configured to receive one support element 80'. The accommodating portion 102' can be integrated with the body 10' or the bottom 70', or the accommodating portion 102' is a separate component and then connected with the body 10' or the bottom 70'. The accommodating portion 102' may also be formed by crimping the edge of the opening 104' or the opening 73', or the accommodating portion 102' is stitched to the edge of the opening 104' or the opening 73'.

An opening and closing structure 90' and a cover 14' can be arranged to at the opening 104' or the opening 73' to open and close the opening 104' or the opening 73'. The opening and closing structure 90' can be zipper or hook and loop fasteners, etc.

Figure 11:
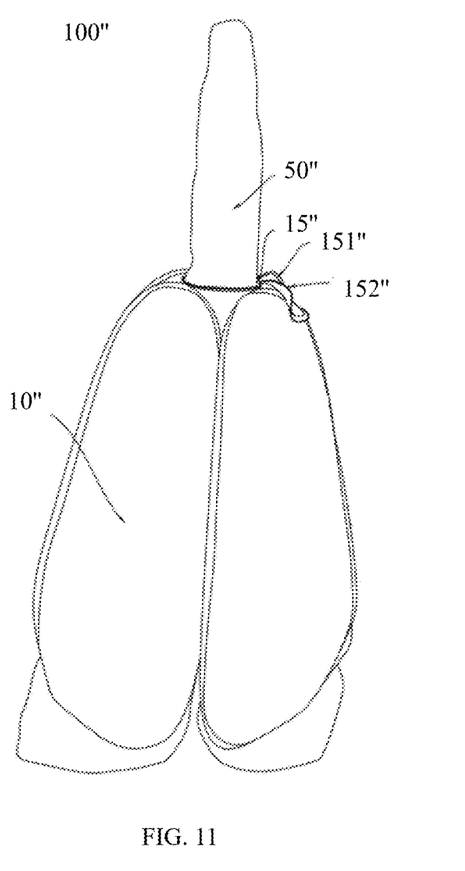
FIG. 11 is a structure diagram of the storage bag according to a third exemplary embodiment of the present disclosure.
Figure 12:
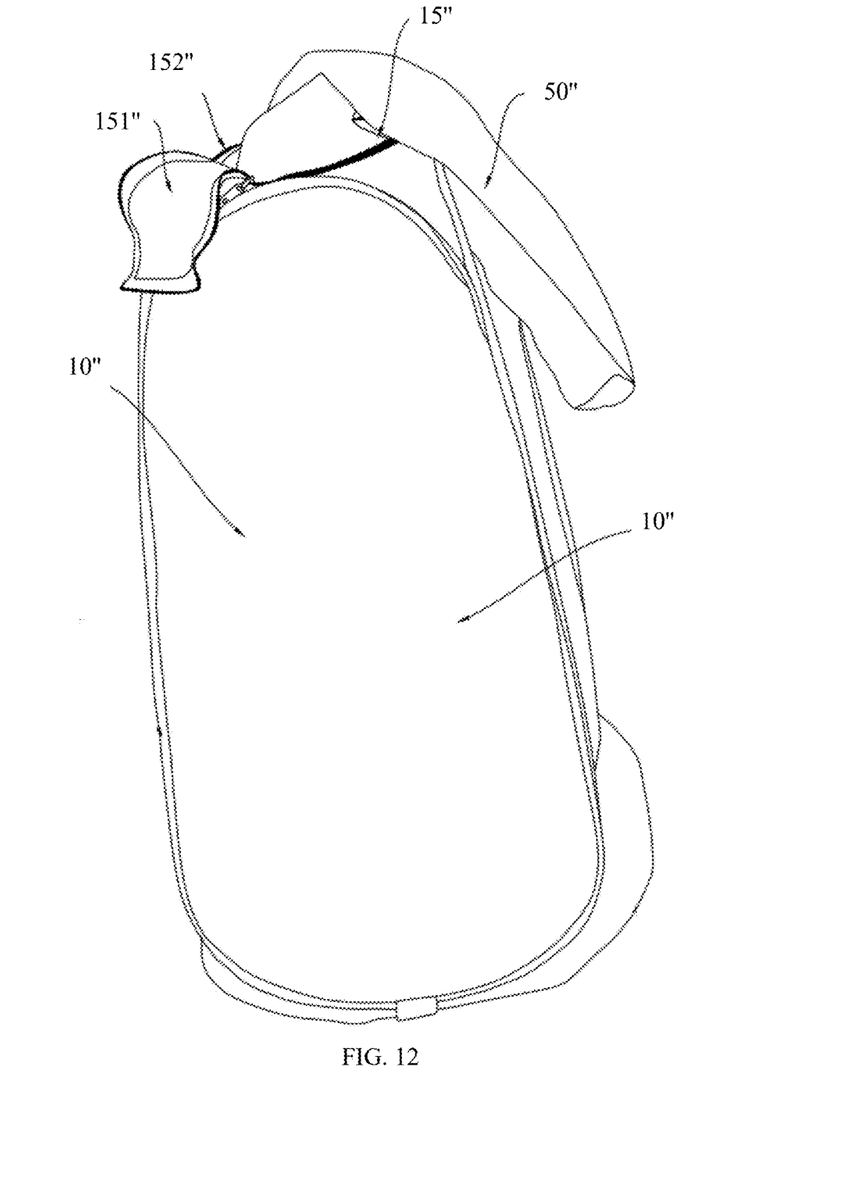
FIG. 12 is a structure diagram of the storage bag of FIG. 11, wherein a top of the storage bag is in a collapsed state.

As shown in FIGS. 11-12, the present disclosure provides a storage bag 100" according to a third embodiment, the structure of the storage bag 100" is similar to that of the storage bag 100, and the differences between the two at least include: a periphery of the upper opening 15" of the body 10" is provided with a cover 151" which is configured for opening and closing the upper opening 15", and the cover 151" is arranged at the upper opening 15" through an opening and closing structure 152"; the top 50" can be received in the body 10" or arranged out of the body 10" by the upper opening 15", and the length of the storage bag 100" can also be increased when the top 50" extends out of the body 10" by the upper opening 15".

The top 50" can be sutured with the inner edge of the upper opening 15", so as to avoid the top 50" affecting the installation of the opening and closing structure 152". The opening and closing structure 152" can be arranged along peripheries of the upper opening 15" and the cover 151".

The cover 151" and the body 10" can be made of the same material or made of different materials, which can be arranged according to actual needs.

Referring to FIGS. 1-14, the present disclosure further provides a storage device 300, which includes the storage bag 100 and a support 200. Of course, the storage device 300 can also include the above-mentioned storage bag 100' or storage bag 100". The present embodiment takes the storage bag 100 as an example to illustrate.

Figure 13:
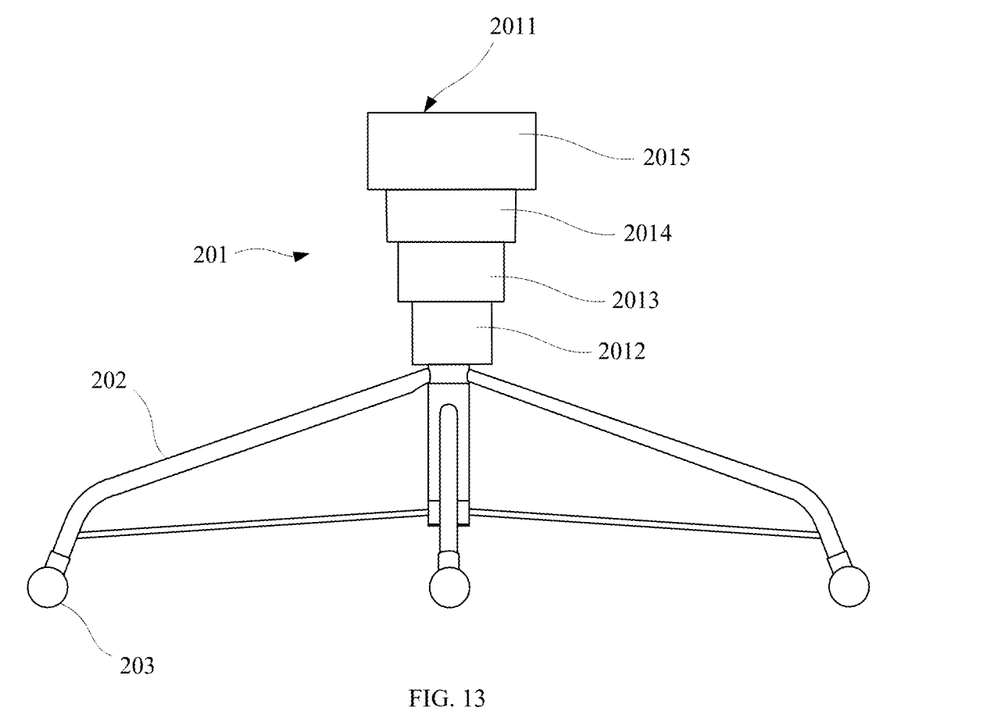
FIG. 13 is a structure diagram of a support of the storage device according to an exemplary embodiment of the present disclosure.
Figure 14:
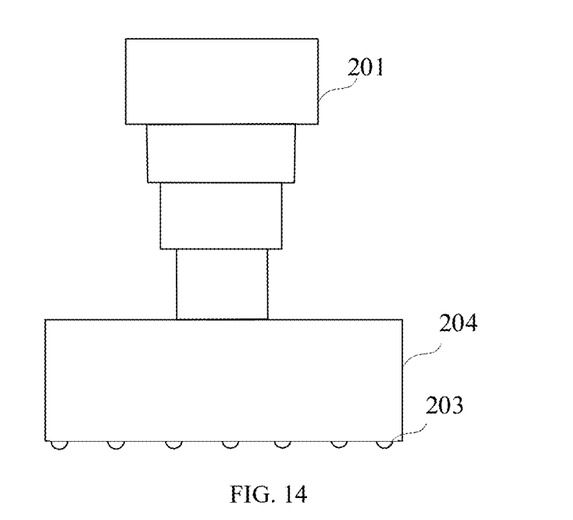
FIG. 14 is a structure diagram of another support of the storage device according to another exemplary embodiment of the present disclosure.

The support 200 can be arranged below the storage bag 100, and when the item 400 is stored in the storage bag 100 the support 200 supports the item 400 and keeps the item 400, such as a Christmas tree, in an upright state.

The support 200 includes a mounting element 201, the size of the mounting element 201 is variable or changeable, as such the mounting element 201 is suitable for mounting items 400 of different sizes. In one embodiment, the mounting element 201 defines a receiving hole 2011, the size of the receiving hole 2011 is variable or changeable. Specifically, the size of the receiving hole 2011 can gradually decrease from top to bottom, as such the mounting element 201 is suitable for mounting items 400 of different sizes. In this way, items 400 of different sizes, such as Christmas trees of different sizes, can be mounted in the mounting element 201.

The mounting element 201 is retractable and includes a plurality of mounting boxes of different sizes, the mounting boxes are movably sleeved with one another. The sizes of the mounting boxes gradually decrease from top to bottom. In this way, Christmas trees with different trunk sizes can be mounted in the appropriate mounting box.

In a specific embodiment, the mounting element 201 includes a first mounting box 2012, a second mounting box 2013, a third mounting box 2014 and a fourth mounting box 2015 which are connected with each other in sequence, the dimensions of the first mounting box 2012, the second mounting box 2013, the third mounting box 2014 and the fourth mounting box 2015 increase sequentially, the first mounting box 2012 is located at the bottom, and the fourth mounting box 2015 is located at the top. Of course, the mounting element 201 may also include only one mounting box.

When the first mounting box 2012, the second mounting box 2013, the third mounting box 2014 and the fourth mounting box 2015 are in an extended state, including a fully extended state or a half extended state, an external force is needed to move at least one of the mounting boxes; when the first mounting box 2012, the second mounting box 2013, the third mounting box 2014 and the fourth mounting box 2015 are in a retracted state, including a fully retracted state or a half retracted state, an external force is needed to move at least one of the mounting boxes. So that, the first mounting box 2012, the second mounting box 2013, the third mounting box 2014 and the fourth mounting box 2015 in the extended state or in the retracted state can support the item 400 stably.

When the trunk of Christmas tree is suitable for being mounted in the fourth mounting box 2015, the trunk of the Christmas tree is mounted in the fourth mounting box 2015; when the trunk of Christmas tree is suitable for being mounted in the third mounting box 2014, the trunk of the Christmas tree can be mounted in the third mounting box 2014, and the fourth mounting box 2015 can be pressed to be sleeved outside the third mounting box 2014; when the trunk of a Christmas tree is suitable for being mounted in the second mounting box 2013, the trunk of the Christmas tree can be mounted in the second mounting box 2013, the fourth mounting box 2015 can be pressed to be sleeved outside the third mounting box 2014, and the third mounting box 2014 can be pressed to be sleeved outside the second mounting box 2013; when the trunk of Christmas tree is suitable for being mounted in the first mounting box 2012, the trunk of the Christmas tree can be mounted in the first mounting box 2012, and the second mounting box 2013, the third mounting box 2014, and the fourth mounting box 2015 are pressed to move downwards to reduce the length of the mounting element 201.

The support 200 further includes a plurality of support feet 202 connected with the mounting element 201, the support feet 202 is used to support the mounting element 201 and the item 400. The bottom of each foot 202 can be provided with a sliding part 203, such as a roller, etc., so that the storage device 300 can move around easily, and the storage device 300 and the item 400 such as a Christmas tree can be easily moved from one place to another.

The support 200 further includes a movable member 204 connected with the mounting element 201, and the movable member 204 and the mounting element 201 can be used to remain the item 400 to be in an upright state. The bottom of the movable member 204 is provided with at least one sliding part 203, such as a roller, etc., so that the storage device 300 can move around easily. And the storage device 300 and the item 400, such as a Christmas tree, can be easily moved from one place to another.

The above description is merely some embodiments. It should be noted that for one with ordinary skills in the art, improvements can be made without departing from the concept of the present disclosure, but these improvements shall fall into the protection scope of the present disclosure.

What is claimed is:

1. A storage bag, comprising:
   a body being capable of standing upright and defining a storage space for storing an item, and a bottom of the body defines an opening communicated with the storage space; and
   a plurality of support members arranged on the body and configured for supporting the body, the support members are strip shaped, wherein the body has a plurality of strip-shaped mounting portions, when the support members extend into their respective mounting portions, the support members deform, the body has a plurality of side surfaces, and each of the side surfaces is provided with one mounting portion, and each of the mounting portions is configured to receive one corresponding support member, so that each of the side surfaces is supported to be in a tauten state.

2. The storage bag of claim 1, wherein
   the bottom of the body includes at least one accommodating portion defining a via hole, the at least one accommodating portion is arranged along a periphery of the opening; and
   the storage bag further comprises at least one support element, the at least one support element is received in the accommodating portion after passing through the via hole to keep the body in an upright state.

3. The storage bag of claim 1, wherein the side surfaces comprise a first side surface and a second side surface adjacent to the first side surface, a gap is defined between the first side surface and the second side surface, the gap is substantially defined along an axial direction of the body; and the storage bag further comprises a first opening and closing structure, the first opening and closing structure is connected between the first side surface and the second side surface, so as to detachably connect the first side surface with the second side surface.

4. The storage bag of claim 1, wherein the body comprises:

a first extension part arranged along a circumference of the body, the first extension part is foldable for increasing a length of the body, the first extension part comprises a first folding portion, a second folding portion, a first connecting element arranged on the first folding portion, and a second connecting element arranged on the second folding portion, the first extension part is unfolded when the first connecting element is separated from and the second connecting element; the first extension part is folded when the first connecting portion is connected with the second connecting portion.

5. The storage bag of claim 4, further comprising:

a first extension part arranged along a circumference of the body, the first extension part is foldable for increasing a length of the body, the first extension part comprises a first folding portion, a second folding portion, a first connecting element arranged on the first folding portion, and a second connecting element arranged on the second folding portion, the first extension part is unfolded when the first connecting element is separated from and the second connecting element; the first extension part is folded when the first connecting portion is connected with the second connecting portion.

6. The storage bag of claim 5, further comprising:

a bottom portion communicated with the body, the bottom portion comprises a third extension part arranged along a circumference of the bottom portion, the third extension part is foldable, the third extension part comprises a fifth folding portion, a sixth folding portion, a fifth connecting element arranged on the fifth folding portion, and a sixth connecting element arranged on the sixth folding portion, the third extension part is unfolded when the fifth connecting element is separated from and the sixth connecting element; the third extension part is folded when the fifth connecting element is connected with the sixth connecting element.

7. A storage bag, comprising:

an upright body defining a storage space for storing an item, the body has a plurality of strip-shaped mounting portions, and a bottom of the body defines an opening communicated with the storage space; and a plurality of support members arranged on the body and configured for supporting the body, the support members are configured to support different portions of the body, the support member is strip shaped, and the support member is made of metal or plastic, wherein when the support members extend into their respective mounting portions, the support members deform, the body has a plurality of side surfaces, and each of the side surfaces is provided with one mounting portion, and each of the mounting portions is configured to receive one corresponding support member, so that each of the side surfaces is supported to be in a tauten state.

8. A storage device, comprising:

a storage bag comprising a body and a plurality of support members arranged on the body, the body is capable of standing upright and defines a storage space for storing an item, a bottom of the body defines an opening communicated with the storage space, the support members are configured for supporting the body, the support members are strip shaped, wherein the body has a plurality of strip-shaped mounting portions, when the support members extend into their respective mounting portions, the support members deform, the body has a plurality of side surfaces, and each of the side surfaces is provided with one mounting portion, and each of the mounting portions is configured to receive one corresponding support member, so that each of the side surfaces is supported to be in a tauten state; and a support configured for supporting the item.

9. The storage device of claim 8, wherein the support comprises a mounting element, the mounting element defines a receiving hole, a size of the receiving hole gradually decreases in a direction from top to bottom for mounting items with different sizes; or the mounting element comprises a plurality of mounting boxes of different sizes, the mounting boxes are sleeved with one another, sizes of the mounting boxes gradually decrease in a direction from top to bottom.

10. The storage device of claim 8, further comprising at least one movable member arranged on the support, the at least one movable member is a roller.

11. The storage bag of claim 1, wherein the support member has a diameter of about 1 mm-1 cm.

12. The storage bag of claim 3, wherein the side surfaces further comprises a third side surface and a fourth side surface, the first side surface, the second side surface, the third side surface and the fourth side surface are connected in sequence, the storage bag further comprises a second opening and closing structure, the second opening and closing structure is connected between the third side surface and the fourth side surface, so as to detachably connect the third side surface with the fourth side surface, and the second opening and closing structure faces towards the first opening and closing structure.

13. The storage bag of claim 1, wherein the body further defines an upper opening, the storage bag further comprises a top portion connected with an inner edge of the upper opening, a cover is arranged at a periphery of the upper opening by a third opening and closing structure and configured to open or close the upper opening, the top portion is received in the body when the upper opening is covered by the cover, the top portion is extended out of the body when the upper opening is not covered by the cover.

14. The storage bag of claim 1, wherein the body substantially has a columnar structure.

15. The storage bag of claim 1, wherein each of the support members has an annular shape.

16. The storage bag of claim 1, wherein an upper end of each of the support members is arc-shaped, and a lower end of each of the support members is also arc-shaped, and two middle parts of each of the support members is straight.

17. The storage bag of claim 1, wherein each of the the mounting portions is arranged on an outer surface of the body or an inner surface or the outer surface of body.

18. The storage bag of claim 1, wherein the support portions are arranged at intervals along a circumference of body, so as to form a plurality of panels on the body which are in tautened states.

19. The storage bag of claim 18, wherein the panels are twisted and folded, so as to fold the storage bag.

20. The storage bag of claim 3, wherein the gap passes through a lower edge of the body and communicates with the opening.

* * * * *